(12) United States Patent
Delling et al.

(10) Patent No.: US 12,534,944 B2
(45) Date of Patent: Jan. 27, 2026

(54) LOCKING MECHANISM

(71) Applicant: GRAMMER Aktiengesellschaft, Ursensollen (DE)

(72) Inventors: Gerhard Delling, Schmidgaden (DE); Deepak Auty, Amberg (DE); Daniel Ilarraza, Grafenwöhr (DE); Kadir Yasaroglu, Bad Schönborn (DE); Stefan Reil, Pfreimd (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 319 days.

(21) Appl. No.: 18/330,188

(22) Filed: Jun. 6, 2023

(65) Prior Publication Data
US 2023/0417091 A1 Dec. 28, 2023

(30) Foreign Application Priority Data

Jun. 22, 2022 (DE) .................. 10 2022 115 602.8
Aug. 5, 2022 (DE) .................. 10 2022 119 790.5

(51) Int. Cl.
*E05B 85/26* (2014.01)
*B60R 11/00* (2006.01)
(Continued)

(52) U.S. Cl.
CPC .............. *E05B 85/26* (2013.01); *B60R 11/00* (2013.01); *E05B 53/005* (2013.01); *E05B 57/00* (2013.01); *B60R 2011/0071* (2013.01)

(58) Field of Classification Search
CPC ........ E05B 85/26; E05B 57/00; E05B 53/005; B60R 2011/0071
See application file for complete search history.

(56) References Cited

U.S. PATENT DOCUMENTS 2,862,460 A * 12/1958 Dorey ............... B61D 7/16
                                                      105/310.1
2,992,031 A * 7/1961 Krause ............... E05B 83/24
                                                      292/226
(Continued)

FOREIGN PATENT DOCUMENTS

| DE | 19808374 | 9/1999 |
|---|---|---|
| DE | 102007031189 | 1/2009 |
| WO | WO 2020/224793 | 11/2020 |

OTHER PUBLICATIONS

Official Action for Germany Patent Application No. 102022119790.5, dated Jan. 26, 2023, 7 pages.

*Primary Examiner* — Mark A Williams
(74) *Attorney, Agent, or Firm* — Sheridan Ross P.C.

(57) ABSTRACT

The invention concerns a locking mechanism provided and adapted to interact with at least one locking element to establish a locking between the locking mechanism and the locking element, wherein the locking mechanism comprises a first locking pawl and a second locking pawl which are rotatable independently of each other about a first rotary axis, wherein the first locking pawl is provided and adapted to interact with a first locking element and wherein the second locking pawl is provided and adapted to interact with a second locking element, wherein a secured locking is present when the first locking element is locked to the first locking pawl and the second locking element is locked to the second locking pawl.

16 Claims, 8 Drawing Sheets

(51) Int. Cl.
*E05B 53/00* (2006.01)
*E05B 57/00* (2006.01)

(56) References Cited

U.S. PATENT DOCUMENTS

| | | | | |
|---|---|---|---|---|
| 3,238,898 | A * | 3/1966 | Floehr | B61D 7/16 |
| | | | | 105/308.1 |
| 3,630,557 | A * | 12/1971 | Pierce | E05B 83/16 |
| | | | | 292/DIG. 43 |
| 5,435,615 | A * | 7/1995 | Schmitz | B60J 7/1851 |
| | | | | 296/121 |
| 5,688,004 | A * | 11/1997 | Karge | E05B 83/12 |
| | | | | 292/201 |
| 6,502,868 | B1 * | 1/2003 | Laspa | B25H 3/02 |
| | | | | 292/26 |
| 8,127,688 | B2 * | 3/2012 | Carifa | B61D 7/18 |
| | | | | 105/310.1 |
| 9,309,701 | B2 * | 4/2016 | Jeffries | B25H 3/02 |
| 9,469,181 | B2 * | 10/2016 | Jeffries | B60J 7/1621 |
| 2016/0200374 | A1 * | 7/2016 | Yamamoto | E05B 65/006 |
| | | | | 292/100 |

* cited by examiner

LOCKING MECHANISM

CROSS REFERENCE TO RELATED APPLICATION

This application claims the benefit of German Patent Application Nos. 10 2022 115 602.8, filed Jun. 22, 2022, and 10 2022 119 790.5, filed Aug. 5, 2022, the contents of which are incorporated herein by reference in their entireties.

FIELD

The invention relates to a locking mechanism which is provided and designed to interact with a locking element. The invention further relates to a component with this locking mechanism in order to be able to lock the component securely with respect to an element.

BACKGROUND

Locking mechanisms are known from the prior art, in which it is assumed purely on suspicion that a secure locking between different components has been achieved.

The object of the present invention is to achieve the safest possible connection by means of a connecting mechanism between the component and the element, which is implemented in a particularly simple manner in terms of construction. The present locking mechanism is based on the fail-safe principle.

SUMMARY

The object is solved by a locking mechanism according to the features described herein.

A main idea of the present invention is to provide a locking mechanism which is provided and designed to interact with two locking elements in order to establish or release a lock.

According to the present invention, it is intended that a locking mechanism is provided which is intended and adapted to interact with at least one locking element in order to establish a locking between the locking mechanism and the locking element, wherein the locking mechanism comprises a first locking pawl and a second locking pawl which are rotatable independently of one another about a first rotary axis, wherein the first locking pawl is provided and adapted to interact with a first locking element, and wherein the second locking pawl is provided and adapted to interact with a second locking element, wherein a secured locking is present when the first locking element is locked to the first locking pawl and the second locking element is locked to the second locking pawl.

Locking is to be understood in such a way that a movement of the component towards the element can be prevented in at least one spatial direction, in particular at least in the height direction.

The locking by the locking mechanism is based on the fail-safe principle.

In contrast, a non-secure locking is present if at most one locking element is locked with the corresponding locking pawl. This means that either none of the locking elements is connected to the corresponding locking pawl or only one of the locking elements is connected to the corresponding locking pawl.

A basic idea is to be able to provide a component that can be releasably connected to an element. This releasable connection can be realised by means of the locking mechanism in interaction with one, two or more locking elements.

It is particularly preferred that the locking mechanism can interact with at least two locking elements. This has the advantage that on the one hand a movement in the height direction and on the other hand rotational movements about the height direction in a plane perpendicular to the height direction can be prevented.

Furthermore, it is preferably provided that the locking mechanism is designed and provided so that in the event of locking with only one of the two locking elements at most, it can be signalled that there is no secured locking.

In terms of construction, the locking mechanism can be described as follows.

According to the invention, the locking mechanism comprises a first locking pawl and a second locking pawl. The locking pawls are connected to a locking axle which extends in a direction perpendicular to the height direction, for example a width direction. Further, the locking pawls are independently rotatable about the first rotary axis formed by the locking axis. The connection of the locking pawls to the locking axle is preferably such that the locking pawls are rotatable relative to the locking axle.

Further preferably, the locking pawls can be spaced apart from each other in the width direction, preferably at a first distance from each other. Due to the spacing of the locking pawls from each other and the rotatable connection to the locking axle, the locking pawls are independently rotatable about the width direction. This means that a locking of the first locking pawl and a locking of the second locking pawl, i.e. a connection to the first locking element or the second locking element, are independent of each other.

The locking elements are preferably arranged in an analogous manner to the locking pawls with respect to each other.

According to a particularly preferred embodiment, a first safety pawl and a second safety pawl are provided which are designed and configured to allow the first safety pawl to interact with the first locking pawl and the second safety pawl to interact with the second locking pawl to achieve secure locking and release of the locking. Preferably, the safety pawls are spaced apart, preferably in the width direction. Preferably, the safety pawls are arranged in an analogous manner to the locking pawls with respect to each other.

Preferably, the safety pawls are connected to a synchronous shaft in a non-rotating manner, whereby a synchronised movement of the safety pawls can be achieved. This means that when the locking mechanism is actuated, the aim is always to lock the two locking pawls. Preferably, the synchronous shaft is arranged parallel to and spaced from the locking axle.

According to a particularly preferred embodiment, it is provided that the locking mechanism comprises a first safety pawl and a second safety pawl which are synchronously rotatable about a second rotary axis, wherein the first safety pawl is provided and adapted to interact with the first locking pawl, and wherein the second safety pawl is provided and adapted to interact with the second locking pawl, such that the locking pawls are held in a locked or non-locked position.

The synchronous axle, through which the second rotary axis is realised, and the locking axle, through which the first rotary axis is realised, can be formed by shafts.

According to a preferred embodiment, it may be provided that the first rotary axis and the second rotary axis are spaced apart and parallel to each other.

By spacing the axes of rotation from one another, a good rotatability of the individual pawls relative to one another and good interaction between the safety pawls and the locking pawls can be achieved.

Particularly preferably, the synchronous axle and the locking axle are mounted stationary between a first holding element and a second holding element by these holding elements except for rotation.

The locking pawls as well as the safety pawls extend in radial direction around the respective axis or axis of rotation.

Particularly preferably, according to one embodiment, it can be provided that each of the locking pawls can be brought from the non-locked position into the position of the locking pawl locked with the corresponding locking element by a rotation in a first direction of rotation about the first rotary axis, wherein the rotation of the locking pawl can be brought about by bringing the locking pawl and the locking element into contact and moving them towards one another.

This means that in a first rotational position of the respective locking pawl, the non-locked position is present and in a second rotational position, the locked position is present with regard to the locking pawls. If both locking pawls are in the locked position, the secured locking is present. If at most one locking pawl is in the locked position, the locking is non-secured.

Since the locking pawls can be moved independently of each other, the locking by the locking pawls is also independent of each other.

In that preferably the safety pawls are provided and designed to hold the locking pawls in a locked or non-locked position, it can be provided according to a preferred embodiment that in the non-locked position the safety pawls are connected to a first section of the corresponding locking pawl and in the locked position the safety pawls are connected to a second section of the corresponding locking pawl, whereby by rotation in the first direction of rotation the respective safety pawl can be displaced from the first section into the second section.

Preferably, the first section and the second section of a locking pawl differ from each other. The safety pawl can be displaced from the first section into the second section and vice versa by a rotary movement about the second rotary axis, depending on the rotary position of the respective associated locking pawl.

In order to return the locking mechanism with the lockable locking pawls from the locked position into the non-locked position, it can be provided in accordance with a preferred embodiment that, in order to return the locking pawl from the locked position into the non-locked position, a return element, preferably a Bowden cable element, is provided, which is connected to the second rotary axis in such a way that, by actuating the return element or, respectively, the Bowden cable element, a rotary movement of the safety pawls about the second rotary axis in a second direction of rotation is initiated, which is opposite to the first direction of rotation.

For improved locking and/or resetting of the locking mechanism or the locking pawls, it can preferably be provided according to a further embodiment that the first rotary axis is acted upon by a first spring force and the locking pawls are each acted upon by a spring force, the first spring force being acted upon by a first torsion spring and each locking pawl being acted upon by a tension spring.

It may further be provided that the synchronous shaft is subjected to the first spring force. The first spring force can be provided by the first torsion spring, for example. For this purpose, the first torsion spring is connected on the one hand to the synchronous shaft and on the other hand to one of the holding elements. Preferably, the first torsion spring is arranged in such a way that the first torsion spring is preloaded in the non-locked position of the respective safety pawl or locking pawl, i.e. that when the locking pawl rotates in the first direction of rotation, the safety pawl rotates from the first section into the second section due to the first spring force.

Further preferably, it may be provided that the locking pawls are each subjected to a spring force. Particularly preferably, each locking pawl is connected to a tension spring, the tension spring being connected on the one hand to the corresponding locking pawl and on the other hand to one of the retaining elements or a further stationary element. It is preferably provided that the tension spring is designed in such a way that the tension spring is tensioned in the locked position or has a higher spring tension than in the non-locked position. This means that when the locking pawl rotates from the second section into the first section, the respective locking pawl is rotated in the second direction of rotation due to the tension spring, so that the locking pawl can be displaced into the first rotational position from the second rotational position.

By applying a spring force to the synchronous shaft or to the locking pawls, rotational movements of the axles can be achieved depending on the position of the elements relative to each other. Likewise, resets of the respective elements can be achieved, depending on which position is assumed.

Particularly preferably, the spring forces of the synchronous shaft and the locking elements are applied in opposite directions to each other, so that rotations in different directions to each other are possible, which can favour the locking or the release of the locking.

In the following, a possible movement sequence of a locking mechanism is described, i.e. that the locking pawls are to be brought into contact with the locking elements.

In a basic state of the locking mechanism, the safety pawls and the locking pawls are designed to contact each other. Preferably, the safety pawls contact a first section of the locking pawls.

When the locking mechanism is brought into contact with the locking elements by moving the locking elements and the locking pawls towards each other and into contact, this results in a rotational movement of the locking pawls in a first direction of rotation. The safety pawls and the locking pawls continue to contact each other in the first section.

The locking pawls are now moved further in the first direction of rotation the closer the locking mechanism and the locking elements are moved towards each other.

After a certain distance of rotation of the locking pawls, the contact between the locking pawls and the safety pawls is released, i.e. the safety pawls and locking pawls no longer contact each other. The application of force to the safety pawls now causes a rotational movement in the first direction of rotation of the pawls. The pawls rotate until they contact the locking pawls in a second section. The locking mechanism is connected to the locking member and to the locking pawl and therefore an interlock has been established.

It should be mentioned here that a rotation of a locking pawl is only caused when the locking pawl contacts a locking element. If this is not the case, the locking pawl is not rotated.

When unlocking or releasing the locking, the last described state of the lock is the current initial state for unlocking.

In a first step, a rotational movement of the safety pawls is caused in a second direction of rotation, which is opposite to the first direction of rotation. Preferably, the synchronous shaft or the safety pawls can be connected to a Bowden cable element so that a rotation in the second direction can be caused when the Bowden cable element is actuated.

This rotation of the synchronous shaft with the safety pawls in the second direction of rotation causes the safety pawls to move relative to the locking pawls. In the process, the safety pawl and the locking pawl make contact in the second section until a certain rotational distance has been covered and the connection between the safety pawl and the locking pawl is released.

As a result of the fact that the locking pawls are also subjected to a spring force, the locking pawls are reset, i.e. they rotate in the second direction of rotation until the locking pawl and the safety pawl contact each other again in the first section. The rotation of the locking pawl releases the locking pawl from the locking element.

Because the synchronous axle is connected to the Bowden cable element, a first end of the Bowden cable element connected to the synchronous axle moves with or indirectly causes movement of the synchronous axle.

This means that when the locking mechanism is locked, i.e. when both locking pawls are locked, the first end of the Bowden cable element is also moved by the movement of the synchronous axle. It should be noted that a rotation of the synchronous axle only occurs when both safety pawls experience a rotation, which only experience a rotation when both locking pawls experience a rotation by contacting the respective locking element.

During unlocking, the Bowden cable element is actuated, i.e. the first end itself is actuated, whereby the synchronous axle and correspondingly the safety pawls undergo a rotation.

Further preferably, the invention relates to a vehicle with the element comprising the locking mechanism and with the locking elements.

The element may be, for example, a box element which may be removed from the vehicle due to space constraints or inserted due to a desired shelf or storage space.

The locking or unlocking can also be described in terms of a method.

In the case of locking, the method steps would be as follows:
  Providing the locking mechanism and the locking elements;
  Contacting the locking mechanism and the locking elements by moving them towards each other, whereby the locking pawls are rotated and the connection between the locking pawls and the safety pawls in the first section is released;
  When the connection of the first section is released, the synchronous axle with the pawls is rotated until the pawls contact the locking pawls in the second section.

The rotations take place automatically due to the contact of the locking pawls with the connecting elements and preferably by means of the spring force actuations. It should be noted that a pawl is only rotated when there is contact between the pawl and the locking element.

In the case of unlocking, the method steps would be provided as follows:
  Providing the locking mechanism and the locking elements, the locking pawls being in contact with the locking element in the second section;
  Operating the Bowden cable element, thereby rotating the synchronous axle and releasing the contacting of the locking pawls and the safety pawls in the second section;
  Rotating the locking pawls until the locking pawls are in contact with the safety pawls in the first section.

In the event that only a locking pawl is contacted with a locking element during locking, there is no rotation of the synchronous axle. This means that the first end of the Bowden cable element is not moved.

Preferably, the Bowden cable element is actuatable by means of an actuating element. Preferably, the actuating element is arranged at a second end of the Bowden cable element.

Particularly preferably, the actuating element may be provided to actuate the locking mechanism on the one hand and to provide an indication of the state of the locking mechanism on the other hand.

Specifically, the actuating element may be arranged on the element and have the following characteristics. Particularly preferably, the actuating element is movable up and down along the height direction.

When the locking mechanism is unlocked, the actuating element is arranged in a first position. Preferably, the actuating element may be coloured green so that this position can be identified.

During a locking and an according movement of the first end of the Bowden cable element, the actuating element is moved to a second position. Preferably, an area which is preferably coloured red can become visible through this. In the second position it can thus be seen that the locking mechanism is correctly locked.

During an unlocking, the actuating element is manually moved from the second position to the first position, so that the first end of the Bowden cable element is moved accordingly. The red coloured area is no longer visible.

In the event that only one locking pawl is contacted with a locking element during locking, the actuating element remains in the first position, as no movement of the first end of the bowden cable element can be caused.

A person can therefore be easily signalled whether the element or the locking mechanism is correctly locked.

Further preferably, comfort pawls can be provided, which are intended and designed to compensate for tolerances between the safety pawls and the locking pawls, so that the locking pawls can be fully rotated into a locking position.

According to a particularly preferred embodiment, it may be provided that a first comfort pawl and a second comfort pawl are provided which are intended and designed to compensate for tolerances between the respective safety pawls and locking pawls so that the locking pawls can be fully rotated into a locked position.

Preferably, two comfort pawls, i.e. a first comfort pawl and a second comfort pawl, are provided, which are connected to the synchronous axle in such a way that a small rotation relative to the synchronous axle is possible.

If the safety pawl and the locking pawl contact each other in the second section, it is possible that there is a small distance between the safety pawl and the locking pawl, so that the locking pawl cannot be fully rotated into the locking position. This can occur due to manufacturing tolerances or also due to abrasion. In order to be able to compensate for this small distance, the comfort pawls are provided. These have an extension in the radial direction which is necessary to fully rotate the locking pawl. The comfort pawl and the safety pawl are offset from each other by an angle. Preferably, the comfort pawls are spring-loaded so that the comfort pawl can be rotated so that the comfort pawl contacts the second section and rotates the locking pawl into the locking position.

Further embodiments and embodiments of the embodiments among each other are applicable to the further embodiments and can be freely combined among each other, provided that they do not correspond to contrary embodiments.

Further advantageous embodiments result from the dependent claims.

The invention is described in more detail below in connection with the figures.

BRIEF DESCRIPTION OF THE DRAWINGS

Further aims, advantages and usefulness of the present invention will be found in the following description in connection with the drawings. Hereby show.

DETAILED DESCRIPTION

In the figures, identical components are to be understood with the corresponding reference signs. For the sake of clarity, components may not have a reference sign in some figures, but have been designated elsewhere.

Figure 1:
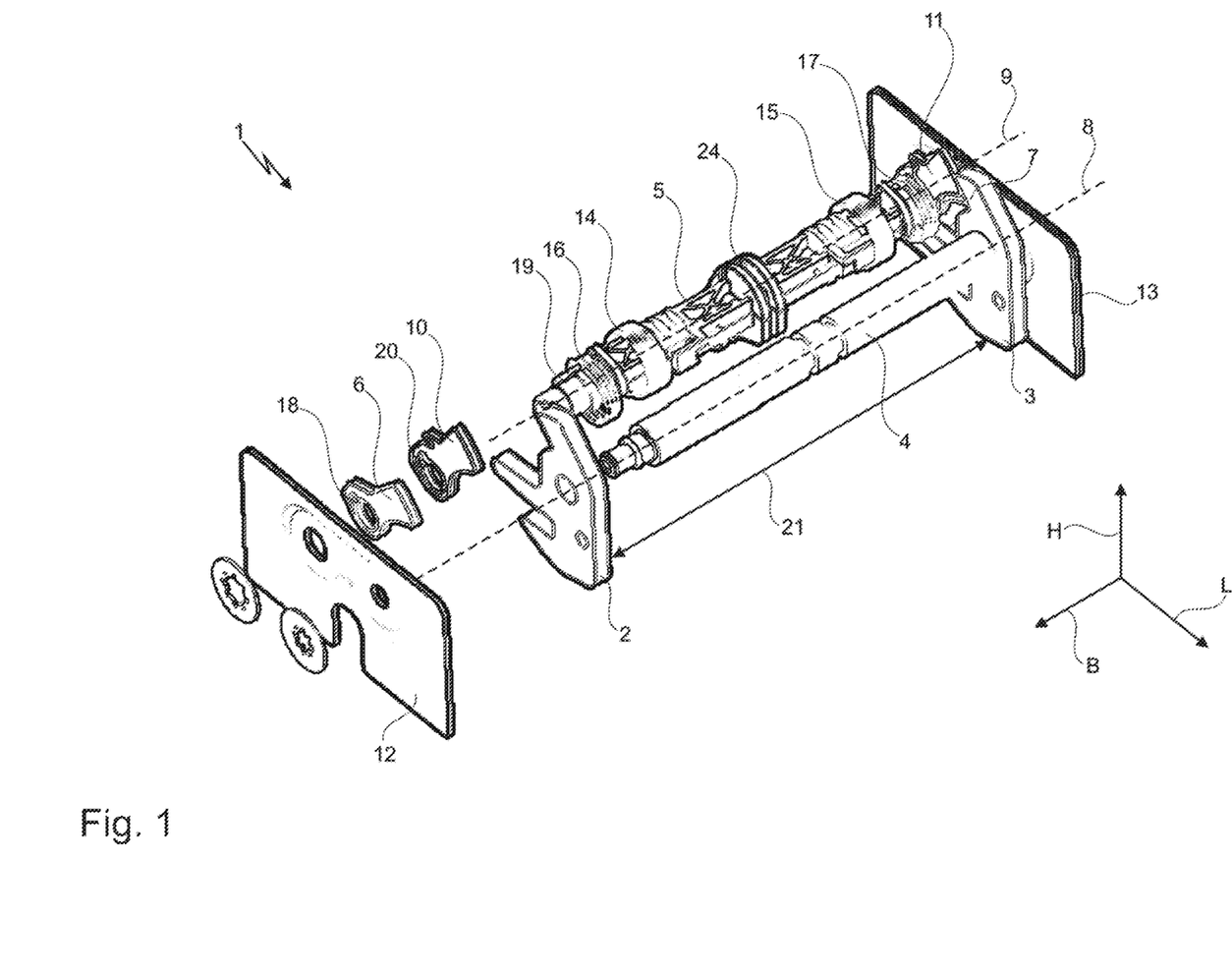
FIG. 1 Locking mechanism according to a preferred embodiment in a partial exploded view.

FIG. 1 shows the locking mechanism 1 according to a preferred design. FIG. 1 shows the locking mechanism 1 in at least a partial exploded view.

As can be seen, the locking mechanism 1 has a first locking pawl 2 and a second locking pawl 3. These are mounted rotatably with respect to a locking axis 4, namely about a first rotary axis 8. The locking pawls 2, 3 are arranged at a first distance 21 from one another in a width direction B.

Furthermore, a synchronous shaft 5 is provided, wherein a first safety pawl 6 and a second safety pawl 7 are arranged on the synchronous shaft 5, which are connected to the synchronous shaft 5 in a non-rotating manner. This can be realised, for example, via a tongue and groove combination with tongue 18 and groove 19.

A first comfort pawl 10 and a second comfort pawl 11 are also provided, which are also connected to the synchronous axle 5. The comfort pawls 10, 11 are connected to the synchronous axle 5 in such a way that a slight rotation with respect to the synchronous axle 5 is possible. For this purpose, the comfort pawls 10, 11 each have an elongated hole 20 which can interact with a corresponding further spring of the synchronous axle 5.

The safety pawls 6, 7 are arranged at a second distance 22 and the comfort pawls 10, 11 at a third distance 23 from each other in width direction B. Preferably, the comfort pawls 10, 11 are arranged between the safety pawls 6, 7 in width direction B or vice versa.

The synchronous axle 5 and the locking axle 4 are rotatably mounted by means of a first holding element 12 and a second holding element 13.

A first torsion spring 14 and a second torsion spring 15 are provided for applying force to the synchronous axle 5. Preferably, these torsion springs 14, 15 surround the synchronous axle 5. Preferably, the torsion springs 14, 15 are connected on the one hand to the synchronous axle 5 and on the other hand to a holding element 12, 13 or another fixed element.

A force is applied to the first comfort pawl 10 by means of a third torsion spring 16 and to the second comfort pawl 11 by means of a fourth torsion spring 17. The torsion springs 16, 17 are connected on the one hand to the synchronous shaft 5 and on the other hand to the respective comfort pawl 10, 11, whereby this application of force is independent of the application of force to the synchronous shaft 5.

A Bowden cable attachment 24 can be arranged on the synchronous shaft 5, which is provided and designed to receive a first end 26 of a Bowden cable element 25.

Figure 2:
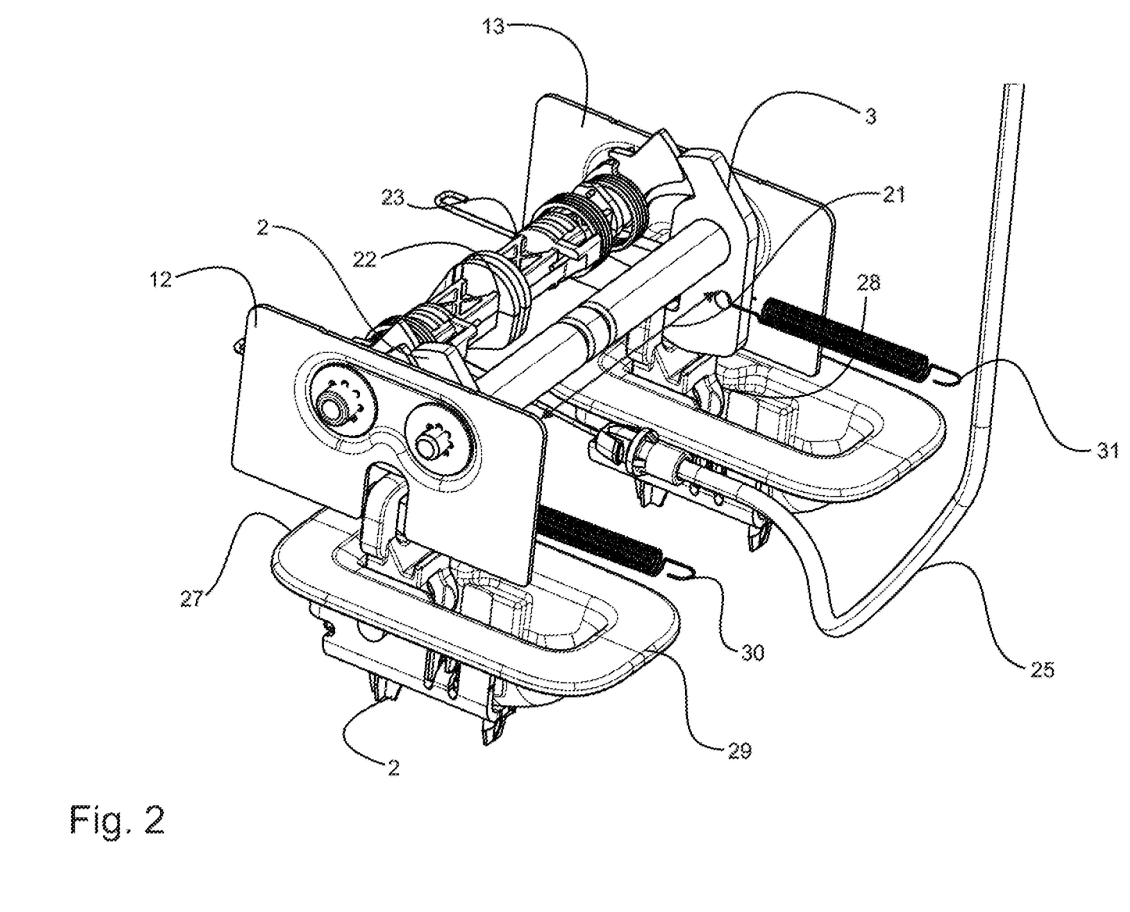
FIG. 2 the locking mechanism according to FIG. 1 in an assembled and perspective view, in secured locking position.

In FIG. 2 the locking mechanism 1 according to FIG. 1 is shown in an assembled state with additional components. According to FIG. 2, the Bowden cable element 25 is now shown, as well as a first locking element 27 and a second locking element 28. The locking elements 27, 28 can, for example, be recessed in a vehicle floor or vehicle body 29. The locking elements 27, 28 are each arranged rotatably with respect to the vehicle floor 29 so that they can be brought from a parking position, i.e. sunk into the floor, into a locking position, i.e. swung completely out of the floor. The locking elements 27, 28 can be of eyelet-like design.

FIG. 2 also shows a first tension spring 30 and a second tension spring 31. The first tension spring 30 is connected on the one hand to the first locking pawl 2 and on the other hand to the first holding element 12 or another fixed element. The second tension spring 31 is connected on the one hand to the second locking pawl 3 and on the other hand to the second retaining element 13 or another fixed element. The fixed element here preferably refers to a section of the element, for example the box element. Preferably, the locking mechanism 1 is fixedly connected to the element by means of the holding elements 12, 13.

FIG. 2 further shows the locking position, i.e. that both locking pawls 2, 3 are in contact with the respective locking element 27, 28.

Figure 3:
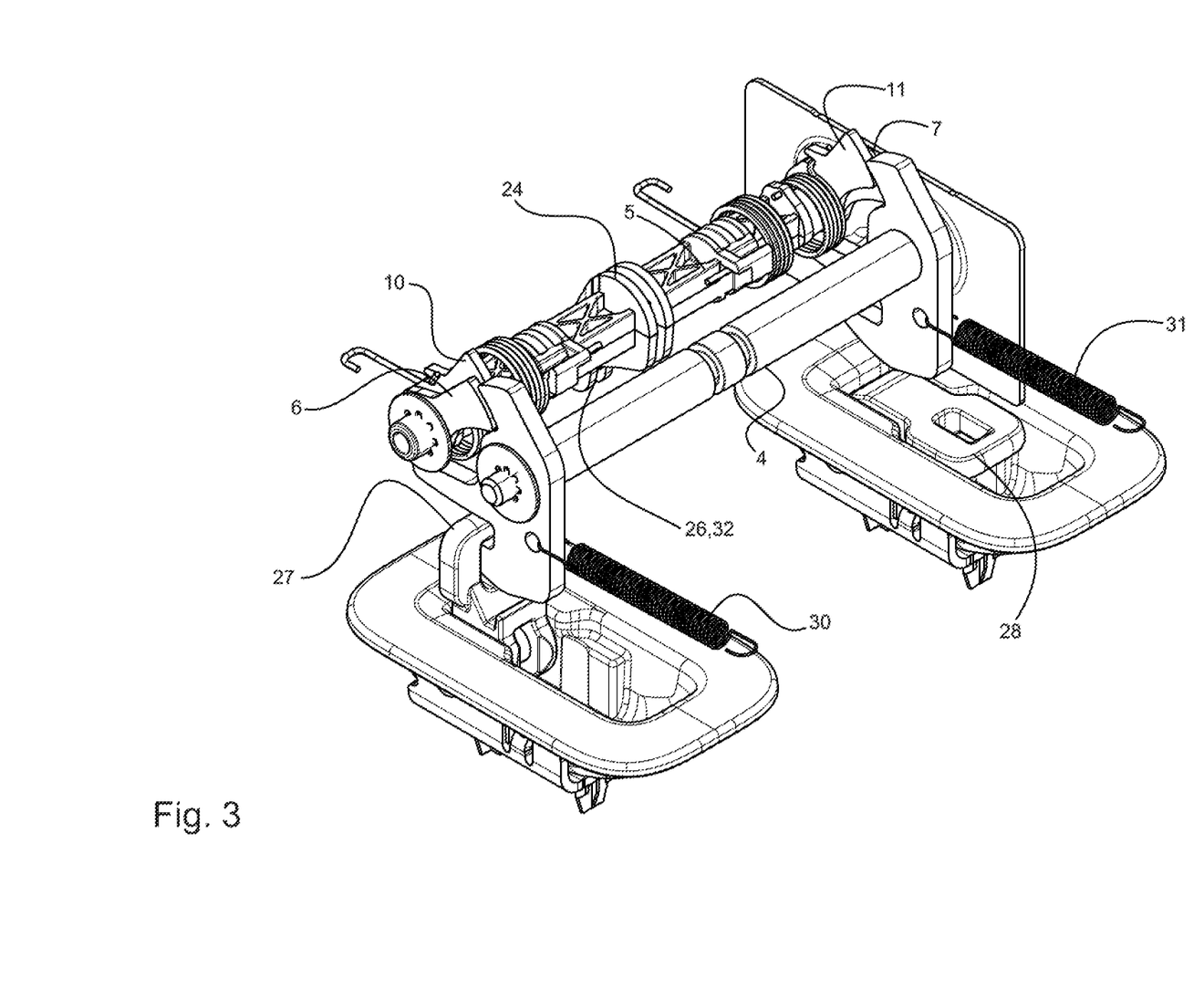
FIG. 3 the locking mechanism according to FIG. 1 in an assembled and perspective view, in a non-secured locking position.

FIG. 3 shows the situation where the locking mechanism 1 is in contact with only one of the locking elements 27, 28. The first locking element 27 is in the locking position, the second locking element 28 is in the parking position. Since the two locking pawls 2, 3 can be rotated independently of each other, only the first locking pawl 2 is locked.

Also an acceptance 32 can be seen by means of which the first end 26 of the Bowden cable element 25 is connected to the synchronous axle 5.

The acceptance 32 is spaced from the synchronous axle in the radial direction thereof, creating a lever which facilitates the rotation of the synchronous axle 5.

According to FIGS. 4A to 4D, the movement sequence during locking of a latch element 2, 3 is shown.

The locking pawls 2, 3 preferably comprise a U-shaped hook element 33 with a first leg 34 and a second leg 35. The hook element 33 is arranged in such a way that the legs 34, 35 can move substantially in a circular path around the first rotary axis 8. Particularly preferably, the locking pawl 2, 3 can be brought into contact with the locking element 27, 28 particularly well if the first leg 34 is formed longer than the second leg 35 and the first leg is arranged closer to the first rotary axis 8 as seen in the radial direction. An opening 36 of the hook element 33, i.e. a free space 36 between the legs 34, 35, can thus be brought into contact with the eyelet-like locking element 27, 28 easily.

The locking part 39 opposite the hook element 33 with respect to the axis of rotation 8 is provided and designed to interact with the safety pawl 6, 7 or with the comfort pawl 10, 11. For this purpose, the locking part 39 has a first section 37 and a second section 38. The first section 37 is essentially an arc of a circle centred on the rotary axis 8. The safety pawls 6, 7 have a complementary third section 40, so that a good contact is possible. The same applies to the second section 38 and a corresponding fourth section 41 of the pawls 6, 7, 10, 11. The second section 38 can be arranged as substantially perpendicular to the first section 37. Correspondingly, the fourth section 41 is perpendicular to the third section 40.

The mode of operation is illustrated in more detail in the further figures below.

Figure 4A:
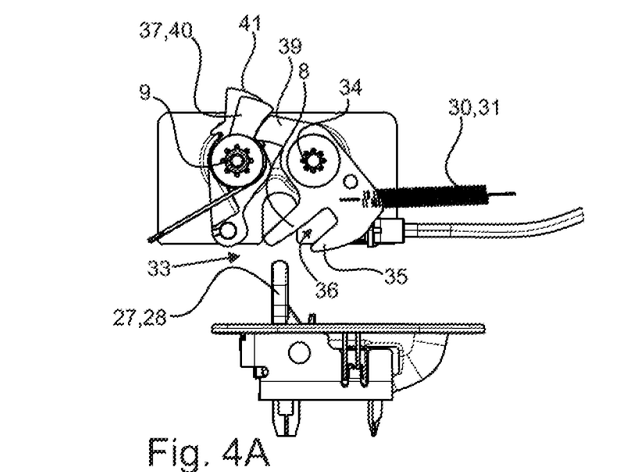
FIGS. 4A-4F movement sequence when a locking pawl is locked.

Specifically for the movement sequence, FIG. 4A shows the locking mechanism 1 in an unlocked state, i.e. there is no contact between the locking pawl 2, 3 and the locking element 27, 28.

Figure 4B:
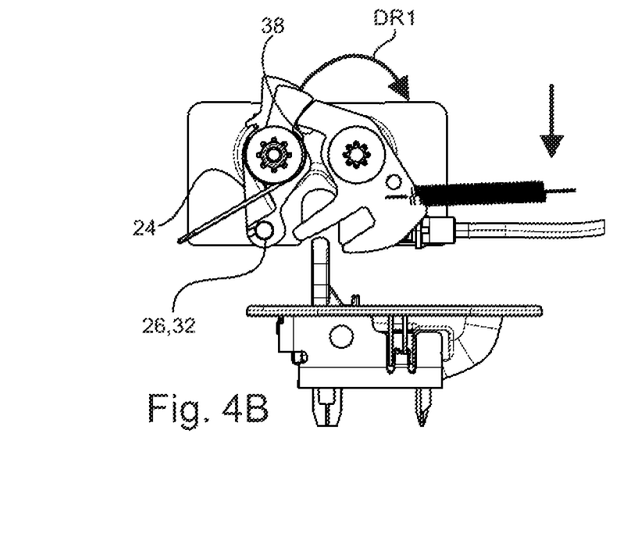

If the locking mechanism 1 is now moved in the direction of the vehicle floor 29 as shown in FIG. 4B, represented by the arrow, the locking pawl 2, 3 and the locking element 27, 28 contact each other, causing a rotation of the locking pawl 2, 3, in this case in a first direction of rotation DR1, which in this case corresponds to clockwise. The locking part 39 moves accordingly.

The first section 37 now moves opposite the third section 40 and the hook element 33 moves in the direction of the locking element 27, 28 and begins to receive the locking element 27, 28 into the opening 36.

Figure 4C:
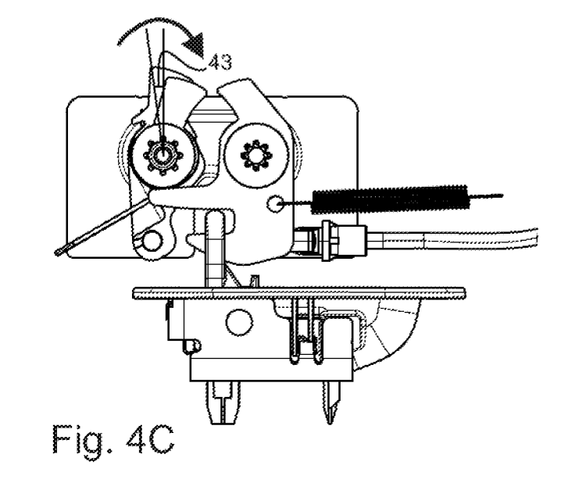
Figure 4D:
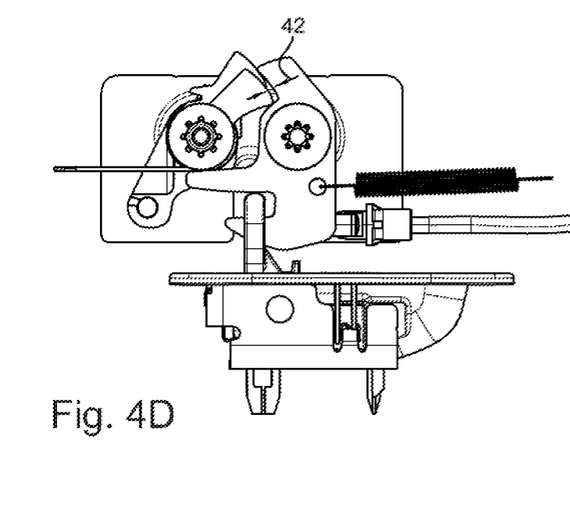

The locking pawl 2,3 is rotated until the first section 37 and the third section 40 no longer contact each other. The hook element 33 now fully engages the locking element 27, 28. Due to the spring-loaded arrangement of the synchronous axle 5, the synchronous axle 5 now rotates with the safety pawls 6, 7 about the second rotary axis 9, also in the first direction of rotation DR1, as shown in FIG. 4C. The synchronous axle 5 or the safety pawl 6, 7 now rotates in the direction DR1 until the safety pawl 6, 7 contacts the second section 38 by means of the fourth section 41, as shown in FIG. 4D. The locking mechanism 1 is now locked.

Corresponding to the movement of the synchronous axle 5, the first end 26 of the Bowden cable element 25 also rotates, namely by means of the Bowden cable attachment 24. The Bowden cable attachment 24 is rigidly connected to the synchronous axle 5.

The movement of the locking pawl 2, 3 stretches the corresponding tension spring 30, 31.

It is further shown that the comfort pawl 10, 11 is arranged at an angle 43 to the safety pawl 6, 7. As can be seen in FIG. 4D, the safety pawl 6, 7 is slightly too small, represented by the distance 42, to rotate the locking pawl 2, 3 to the fully locked position or condition. Since the comfort pawl 10, 11 is radially longer than the safety pawl 6, 7 and is also force-loaded as described and allows a slight rotation relative to the synchronous axle 5, the comfort pawl 10, 11 can continue to rotate in the direction of DR1 and the locking pawl 2, 3 can continue to rotate in the direction of DR1.

Figure 4E:
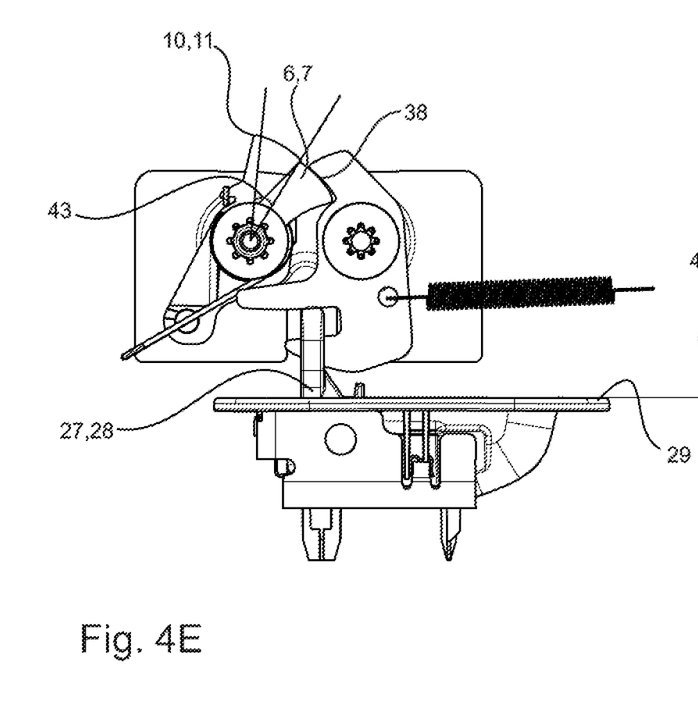
Figure 4F:
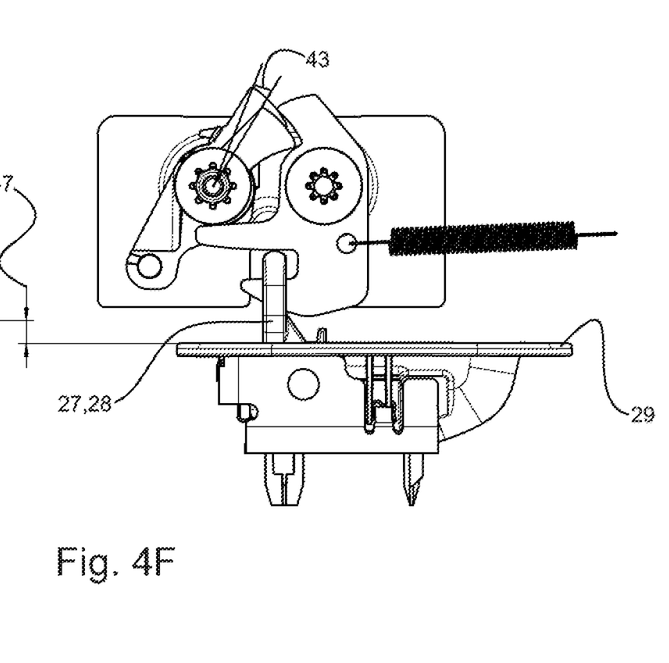

The function of the comfort pawl 10, 11 is shown again more precisely in FIGS. 4E and 4F.

FIG. 4E shows the situation where the safety pawl 6, 7 contacts the second section 38, but the locking pawl 2, 3 is not fully rotated to the locked position. There is therefore still a degree of freedom with regard to the rotation of the locking pawl 2, 3, but at the same time no more rotation of the safety pawl 6, 7 is possible.

Due to the design of the comfort pawl 10, 11, the comfort pawl 10, 11 can rotate even further and thus the locking pawl 2, 3 can now rotate to the fully locked position. This is illustrated in FIG. 4F. The tolerance 47 of the locking mechanism 1 can therefore be compensated.

The angle 43 between the comfort pawl 10, 11 and the safety pawl 6, 7 is variable, as can be seen from a comparison of FIGS. 4E and 4F.

Preferably, the comfort pawl 10, 11 is also formed with the third section and the fourth section, and as mentioned above, however, is formed longer in the radial direction than the safety pawl 6, 7.

FIGS. 5A to 5D show the movement sequence when the locked locking mechanism 1 is unlocked.

Figure 5A:
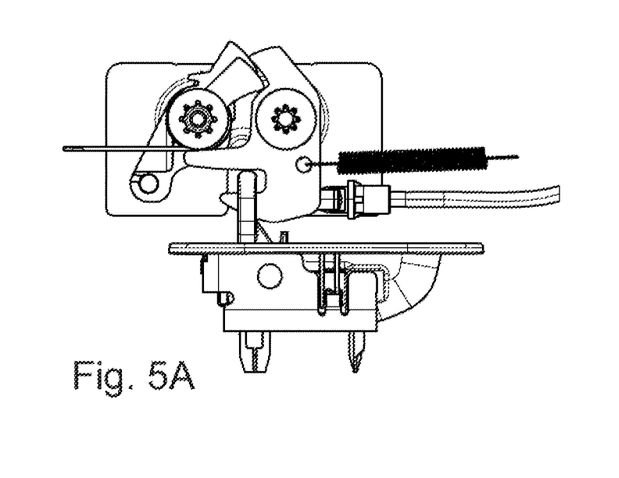
FIGS. 5A-5D Movement sequence for releasing the locking of a locking pawl.
Figure 5B:
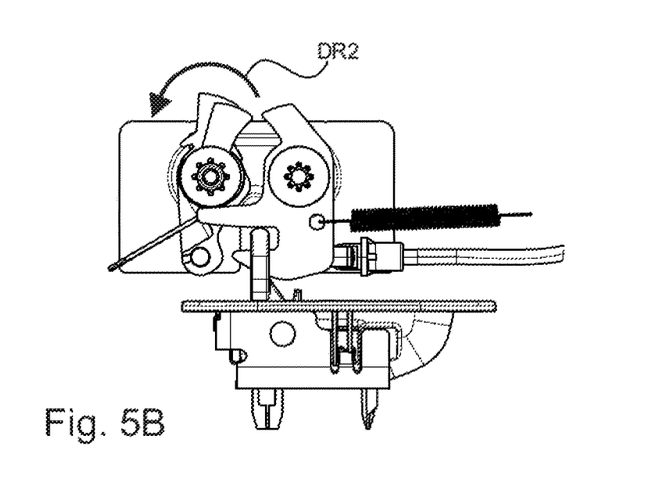
Figure 5C:
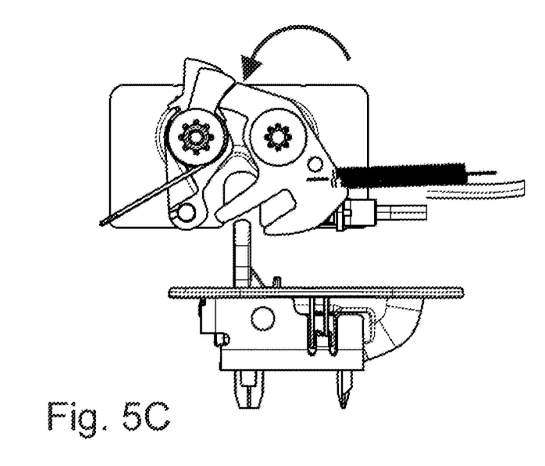
Figure 5D:
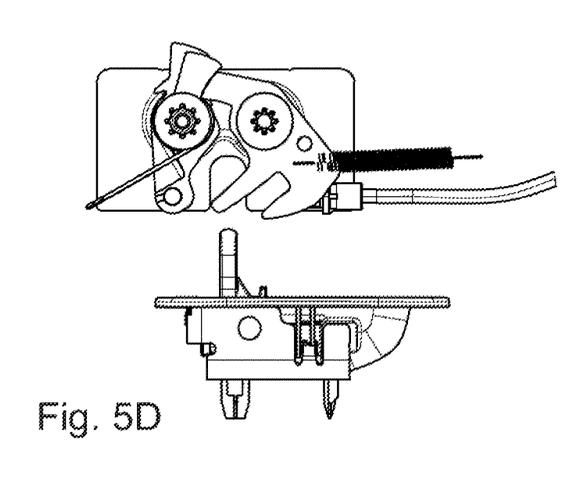

FIG. 5A corresponds to FIG. 4D, i.e. the locked state. It is now necessary to move the safety pawl 6, 7 out of the second section 38. To do this, the bowden cable element 25 is actuated. This means that the synchronous axle 5 can undergo a rotation in the direction DR2, i.e. counterclockwise, so that the pawls 6, 7, 10, 11 are guided out of the second section 38.

If the locking pawl 2, 3 and the safety pawl 6, 7 as well as the comfort pawl 10, 11 are no longer in contact, the tension spring 30, 31 will cause the locking pawl 2, 3 to move back in the direction of DR2, so that first the situation of FIG. 4B and finally the situation of FIG. 4A is restored. The locking mechanism 1 and the locking elements 27, 28 are released from each other and the element can be removed.

Figures 6A, 6B:
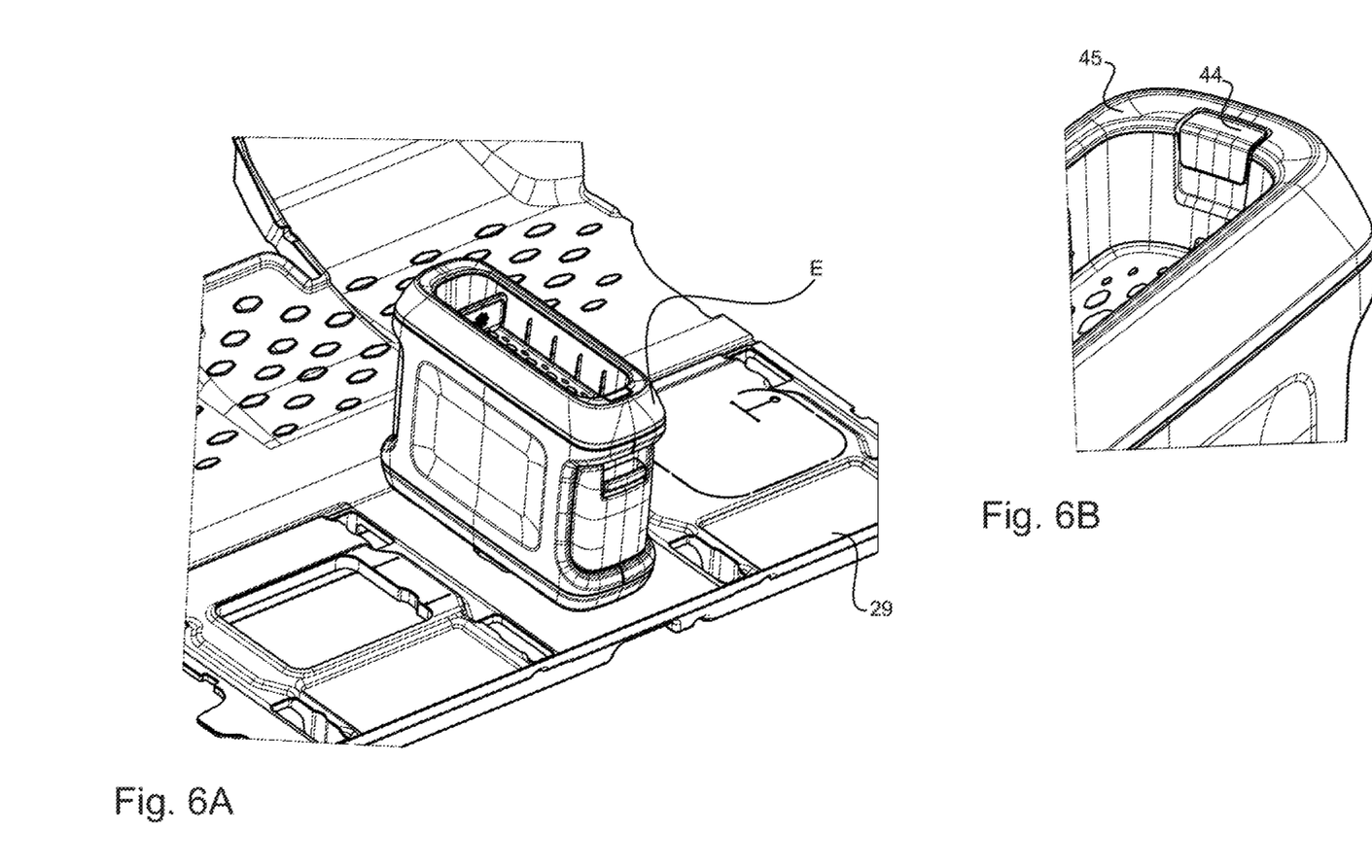
FIG. 6A Element with locking mechanism locked to a vehicle floor.
FIG. 6B Section of the element in FIG. 6A in secured locking position.

FIG. 6A shows the element E or the box element E which can be placed on and locked to a vehicle floor 29.

FIG. 6B shows a section of the element E with the actuating element 44 for actuating the Bowden cable element. FIG. 6B corresponds to the locked representation shown in FIG. 6A.

The element E preferably has a flat upper side 45, whereby the actuating element 44 is flush with the upper side 45 in case of correct locking. The actuating element 44 can also be coloured, for example green. This can provide visual and tactile feedback to the person that the element E is correctly locked.

Figures 7A, 7B:
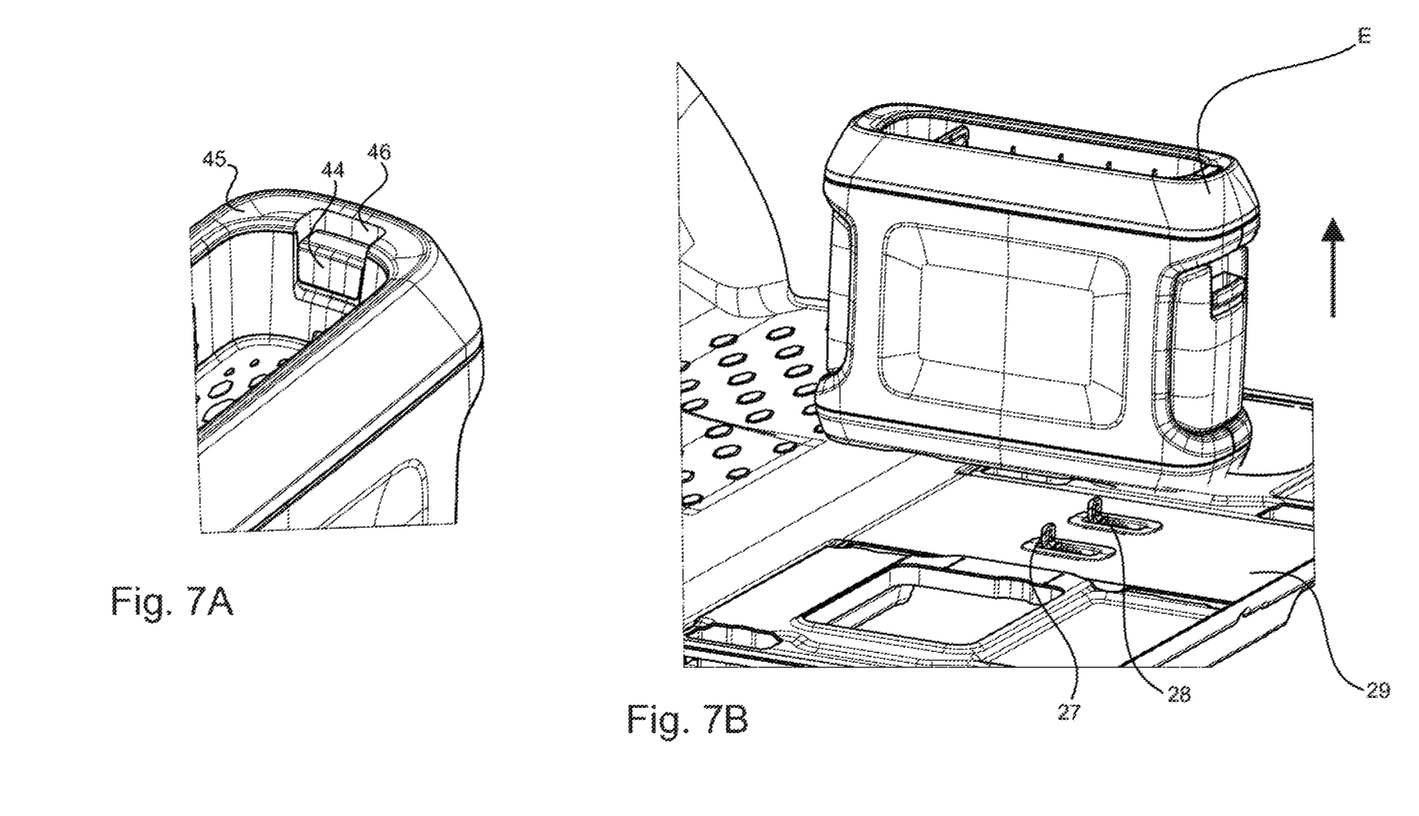
FIG. 7A Element according to FIG. 6A in non-secured locking position.
FIG. 7B Element according to FIG. 6A in non-locked condition.

In FIGS. 7A and 7B, an unlocked position can be seen and the element E is spaced apart from the vehicle floor 29. To unlock the locking mechanism 1, the Bowden cable element 25 was actuated by means of the actuating element 44, for example as shown, pressed downwards. The actuating element 44 is no longer flush with the upper side 45. By pressing the actuating element 44 downwards, a viewing range 46 has now been exposed, which may be coloured differently from the actuating element 44, for example red. This can provide visual and haptic feedback to the person that the element E is unlocked.

In the event that the locking mechanism 1 is not correctly locked, but the element E is in contact with the vehicle floor 29, the situation shown in FIG. 7A is further illustrated, as the synchronous axle 5 cannot rotate. This can also provide feedback that the locking has not been carried out correctly. The reason for this can be a locking element 27, 28 that has not been raised, as shown in FIG. 3.

All features disclosed in the application documents are claimed to be essential to the invention insofar as they are new, individually or in combination, compared to the prior art.

The features relating to the structural design and the process features may be used in a corresponding manner. Likewise, the features of the locking mechanism, the element with the locking mechanism and the vehicle with the element and the locking elements can also be used in a corresponding manner.

All the features listed can be combined with each other in any way.

LIST OF REFERENCES

1 Locking mechanism
2 first locking pawl
3 second locking pawl
4 Locking axle
5 Synchronous axle
6 first safety pawl
7 second safety pawl
8 first rotary axis
9 second rotary axis
10 first comfort pawl
11 second comfort pawl
12 first holding element
13 second holding element
14 first torsion spring
15 second torsion spring
16 third torsion spring
17 fourth torsion spring
18 first groove
19 first spring
20 elongated hole
21 first distance
22 second distance
23 third distance
24 Bowden cable attachment
25 Bowden cable element
26 first end of the bowden cable element
27 first locking element
28 second locking element
29 vehicle floor
30 first tension spring
31 second tension spring
32 Acceptance
33 hook element
34 first leg
35 second leg
36 Opening, free space
37 first section
38 second section
39 locking part
40 third section
41 fourth section
42 distance
43 angle
44 actuating element
45 upper side
46 viewing range
47 Tolerance
DR1 first direction of rotation
DR2 second direction of rotation
E Element, box element
H Height direction
B Width direction
L longitudinal direction

What is claimed is:

1. A locking mechanism provided and adapted to interact with at least one locking element to establish a locking between the locking mechanism and the locking element,
   wherein the locking mechanism comprises a first locking pawl and a second locking pawl which are rotatable independently of each other about a first rotary axis, wherein the first locking pawl is provided and adapted to interact with a first locking element and wherein the second locking pawl is provided and adapted to interact with a second locking element, wherein a secured locking is present when the first locking element is locked to the first locking pawl and the second locking element is locked to the second locking pawl,
   wherein the locking mechanism comprises a first safety pawl and a second safety pawl which are synchronously rotatable about a second rotary axis, the first safety pawl being provided and adapted to interact with the first locking pawl, and the second safety pawl being provided and adapted to interact with the second locking pawl, such that the locking pawls are held in a locked or unlocked position, and
   wherein a first comfort pawl and a second comfort pawl are provided, which are designed and configured to compensate for tolerances between the respective safety pawls and locking pawls so that the locking pawls can be fully rotated into the locked position.

2. The locking mechanism according to claim 1,
   wherein each of the locking pawls is movable from the unlocked position to the locked position of the locking pawl with a corresponding locking element by a rotation in a first direction of rotation about the first rotary axis, the rotation of the locking pawl being caused by bringing the locking pawl and the locking element into contact with and towards each other.

3. The locking mechanism according to claim 1,
   wherein in the unlocked position, the safety pawl is connected to a first section of the corresponding locking pawl and, in the locked position, the safety pawl is connected to a second section of the corresponding locking pawl, the respective safety pawl being displaceable from the first section into the second section by rotation in a first direction of rotation.

4. The locking mechanism according to claim 2,
   wherein for returning the locked position into the unlocked position, a Bowden cable element is provided which is connected to the second rotary axis in such a way that actuation of the Bowden cable element can cause the safety pawls to rotate in a second direction of rotation which is opposite to the first direction of rotation.

5. The locking mechanism according to claim 1,
   wherein the first rotary axis is acted upon by a first spring force and the locking pawls are each acted upon by a spring force, the first spring force being acted upon by a first torsion spring and each locking pawl being acted upon by a tension spring.

6. The locking mechanism according to claim 1,
   wherein the comfort pawls are each arranged at an angle to the safety pawls and are connected to the second rotary axis in such a way that a slight rotation relative to the second rotary axis is possible, wherein the comfort pawls are subjected to a spring force.

7. The locking mechanism according to claim 1, wherein the first rotary axis and the second rotary axis are spaced apart and parallel to each other.

8. The locking mechanism according to claim 1, wherein the locking pawls are arranged at a first distance from each other in a width direction and the safety pawls are arranged at a second distance from each other in the width direction.

9. The locking mechanism according to claim 3, wherein for returning the locked position into the unlocked position, a Bowden cable element is provided which is connected to the second rotary axis in such a way that actuation of the Bowden cable element can cause the safety pawls to rotate in a second direction of rotation which is opposite to the first direction of rotation.

10. The locking mechanism according to claim 1, wherein the first rotary axis is acted upon by a first spring force and the locking pawls are each acted upon by a spring force, the first spring force being acted upon by a first torsion spring and each locking pawl being acted upon by a tension spring.

11. The locking mechanism according to claim 1, wherein the first rotary axis is acted upon by a first spring force and the locking pawls are each acted upon by a spring force, the first spring force being acted upon by a first torsion spring and each locking pawl being acted upon by a tension spring.

12. The locking mechanism according to claim 2, wherein the first rotary axis is acted upon by a first spring force and the locking pawls are each acted upon by a spring force, the first spring force being acted upon by a first torsion spring and each locking pawl being acted upon by a tension spring.

13. The locking mechanism according to claim 3, wherein the first rotary axis is acted upon by a first spring force and the locking pawls are each acted upon by a spring force, the first spring force being acted upon by a first torsion spring and each locking pawl being acted upon by a tension spring.

14. The locking mechanism according to claim 4, wherein the first rotary axis is acted upon by a first spring force and the locking pawls are each acted upon by a spring force, the first spring force being acted upon by a first torsion spring and each locking pawl being acted upon by a tension spring.

15. The locking mechanism according to claim 1, wherein the first rotary axis and the second rotary axis are spaced apart and parallel to each other.

16. The locking mechanism according to claim 1, wherein the at least one locking element is provided as part of a first element and the locking mechanism is provided as part of a second element, wherein the locking mechanism establishes a locking between the first element and the second element.

* * * * *